(12) United States Patent
Hansen

(10) Patent No.: US 10,717,154 B2
(45) Date of Patent: Jul. 21, 2020

(54) ACTIVE PEENING OF GEAR TEETH IN AN ASSEMBLED GEARBOX

(71) Applicant: Sikorsky Aircraft Corporation, Stratford, CT (US)

(72) Inventor: Bruce D. Hansen, Shelton, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 325 days.

(21) Appl. No.: 15/752,820

(22) PCT Filed: Aug. 29, 2016

(86) PCT No.: PCT/US2016/049247
§ 371 (c)(1),
(2) Date: Feb. 14, 2018

(87) PCT Pub. No.: WO2017/040398
PCT Pub. Date: Mar. 9, 2017

(65) Prior Publication Data
US 2018/0236599 A1 Aug. 23, 2018

Related U.S. Application Data

(60) Provisional application No. 62/212,262, filed on Aug. 31, 2015.

(51) Int. Cl.
*B23K 26/00* (2014.01)
*B23K 26/08* (2014.01)
(Continued)

(52) U.S. Cl.
CPC ........ *B23K 26/0823* (2013.01); *B23K 26/356* (2015.10); *B23P 9/00* (2013.01);
(Continued)

(58) Field of Classification Search
CPC .............. B23K 26/0823; B23K 26/356; B23K 2101/008; C21D 9/32; C21D 10/005;
(Continued)

(56) References Cited

U.S. PATENT DOCUMENTS 4,539,461 A 9/1985 Benedict et al.
5,756,965 A 5/1998 Mannava
(Continued)

FOREIGN PATENT DOCUMENTS

| CN | 103060796 A | 4/2013 |
|---|---|---|
| CN | 103409599 A | 11/2013 |
| EP | 2759744 A1 | 7/2014 |

OTHER PUBLICATIONS

Extended European Search Report; European Application No. 16842750.8; dated Feb. 18, 2019; 5 Pages.
(Continued)

*Primary Examiner* — Donnell A Long
(74) *Attorney, Agent, or Firm* — Cantor Colburn LLP

(57) ABSTRACT

A gearbox is provided having a housing, a gear having a plurality of teeth operationally configured within the housing, and a laser peening device located within the housing and configured to perform active laser peening on a predetermined surface of the gear while the gear is rotated within the housing. A method of maintaining compressive residual stresses in a gear is provided, the method including operating a gearbox to rotate a gear within the gearbox and laser peening a predetermined surface of the gear with a laser peening device located within the gearbox.

20 Claims, 3 Drawing Sheets

(51) Int. Cl.

| | | |
|---|---|---|
| *B23K 26/356* | (2014.01) | |
| *B23P 9/00* | (2006.01) | |
| *C21D 10/00* | (2006.01) | |
| *B23P 9/04* | (2006.01) | |
| *C21D 9/32* | (2006.01) | |
| *B23K 101/00* | (2006.01) | |
| *F16H 57/038* | (2012.01) | |
| *B64C 27/12* | (2006.01) | |
| *F16H 55/06* | (2006.01) | |

(52) U.S. Cl.
CPC ............ *B23P 9/04* (2013.01); *C21D 9/32* (2013.01); *C21D 10/005* (2013.01); *B23K 2101/008* (2018.08); *B64C 27/12* (2013.01); *F16H 55/06* (2013.01); *F16H 57/038* (2013.01)

(58) Field of Classification Search
CPC .... B23P 9/04; B23P 9/00; B64C 27/12; F16H 57/038; F16H 55/06
See application file for complete search history.

(56) References Cited

U.S. PATENT DOCUMENTS

| | | | |
|---|---|---|---|
| 5,790,620 A * | 8/1998 | Okazaki | B23K 26/0608 376/305 |
| 6,288,358 B1 | 9/2001 | Dulaney et al. | |
| 6,867,390 B2 | 3/2005 | Clauer et al. | |
| 7,966,856 B1 | 6/2011 | Razi et al. | |
| 2007/0000130 A1* | 1/2007 | Cisek | B23P 9/00 29/893 |
| 2009/0160371 A1 | 6/2009 | Inagaki et al. | |
| 2009/0230104 A1 | 9/2009 | Domec et al. | |
| 2010/0200123 A1 | 8/2010 | Kirkwood et al. | |
| 2010/0300229 A1* | 12/2010 | Sato | B24B 31/003 74/457 |
| 2011/0017006 A1* | 1/2011 | Wern | B24B 31/073 74/457 |
| 2011/0308290 A1 | 12/2011 | Bunting et al. | |
| 2014/0208861 A1* | 7/2014 | Ehinger | G01N 3/02 73/788 |
| 2014/0277829 A1 | 9/2014 | Hale et al. | |
| 2016/0375531 A1* | 12/2016 | Wern | B23P 15/14 451/37 |
| 2018/0016650 A1* | 1/2018 | Hansen | C21D 7/06 |

OTHER PUBLICATIONS

PCT ISR Written Opinion; International Application No. PCT/US 16/49247; International Filing Date: Aug. 29, 2016, dated Nov. 10, 2016, pp. 1-5.

PCT Notification of Transmittal of the International Search Report; International Application No. PCT/US 16/49247; International Filing Date: Aug. 29, 2016, dated Nov. 10, 2016, pp. 1-10.

* cited by examiner

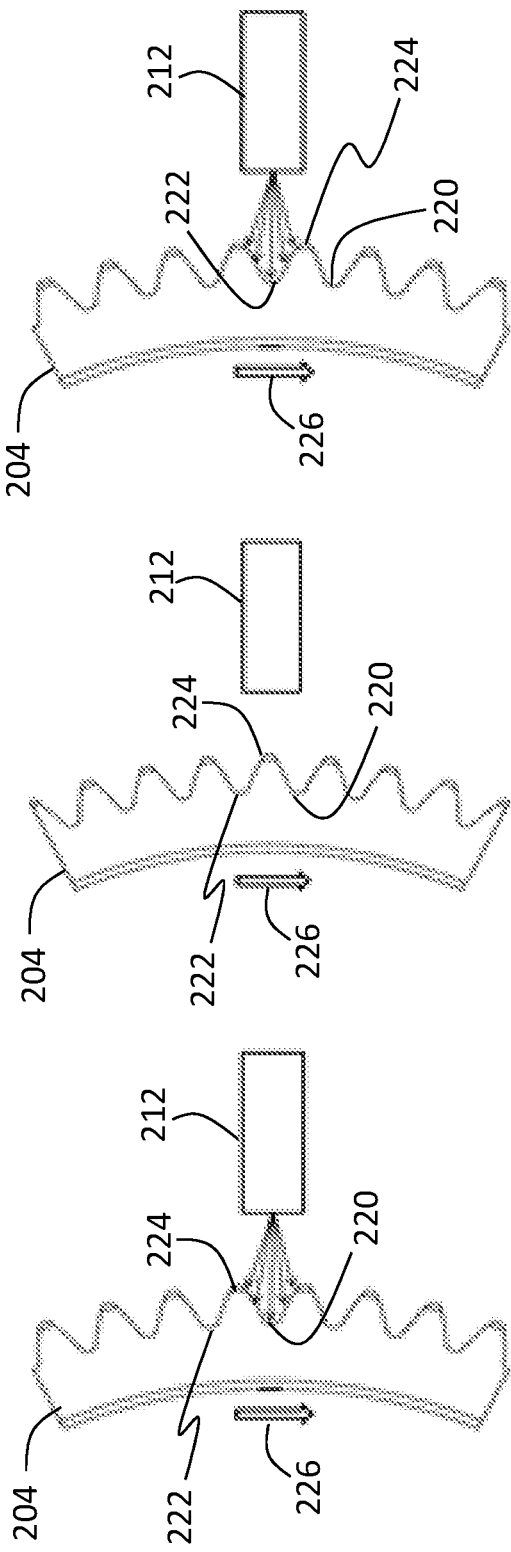

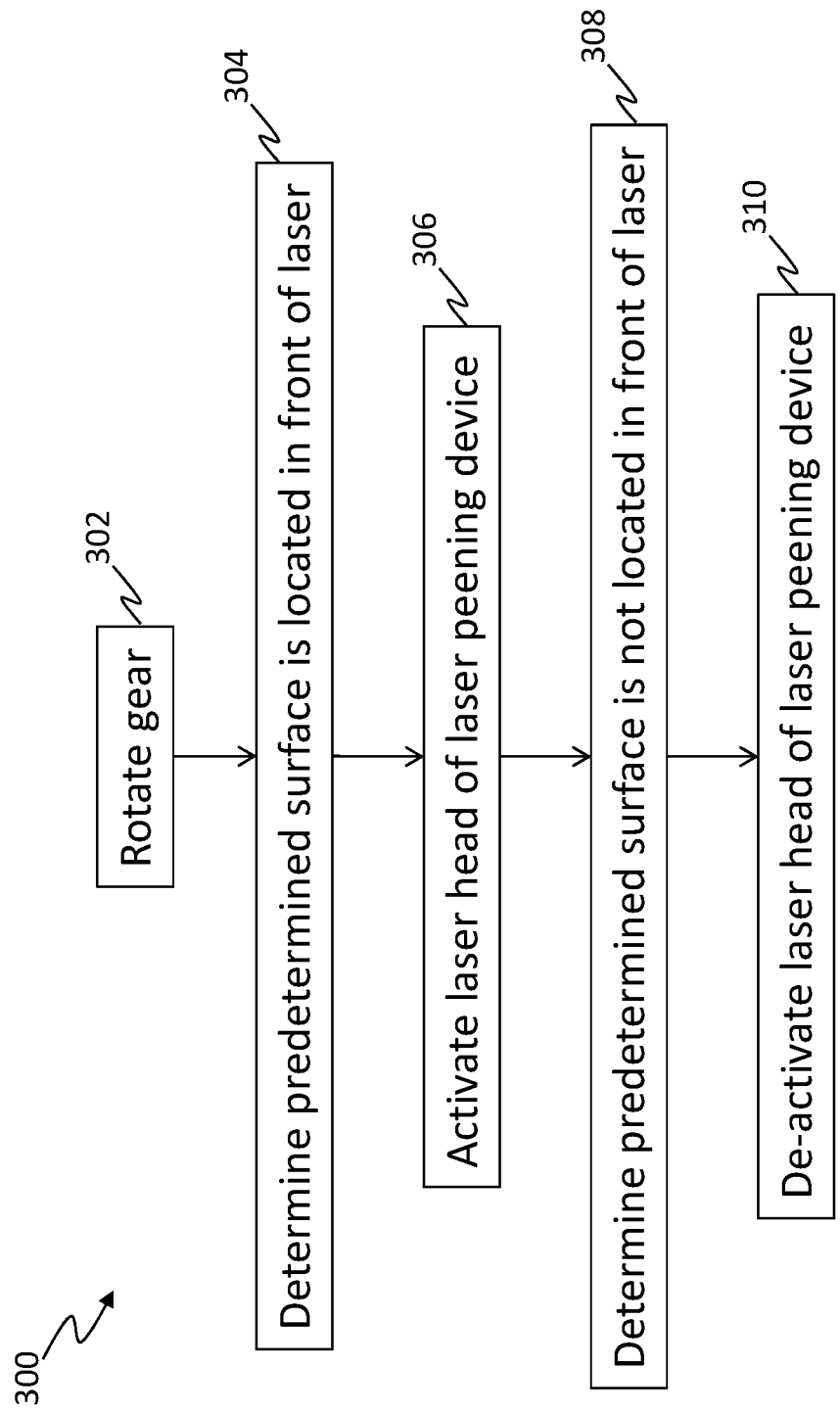

ACTIVE PEENING OF GEAR TEETH IN AN ASSEMBLED GEARBOX

CROSS REFERENCE TO RELATED APPLICATIONS

This application is a National Stage application of PCT/US2016/049247, filed Aug. 29, 2016, which claims the benefit of U.S. Provisional Application No.: 62/212,262, filed Aug. 31, 2015, both of which are incorporated by reference in their entirety herein.

BACKGROUND

The subject matter disclosed herein generally relates to gearboxes and, more particularly, to active peening of gears in an assembled gearbox.

Gears are used in various industrial and technological applications to permit power transmission from one rotating or translating element to another. Each gear generally includes an array of gear teeth that mesh with the gear teeth of another gear so that the rotation or translation of the first gear can be transmitted to the second. The forces on the gear teeth over time may cause failure of the gear, i.e., end of life of the gear. Conventional gearing or gears may be heat treated then final ground during manufacture to increase the strength and life of the gears and gear teeth. Enhancements to improve gear life beyond heat treatment and final grinding may include peening and superfinishing of the gear at the end of the manufacturing process. Such processes may increase compressive residual stresses and strength of the material forming the gear, the gear itself, and the gear teeth that may be subject to the highest impacts and forces during operation.

For example, peening may increase the compressive residual stress on gear tooth flanks and roots beyond the residual stresses induced during the heat treatment and final grinding processes of manufacture. These increased compressive residual stresses may result in higher load carrying capability and gear life as compared to non-peened gears.

However, as the gear is in service in a rotorcraft gearbox, i.e., in use, the compressive residual stresses imparted through the peening process may relax on the surface and may be redistributed through the gear tooth. With less compressive residual stress on the surface, load carrying capability may be reduced along with gear life.

SUMMARY

According to one embodiment, a gearbox is provided having a housing, a gear having a plurality of teeth operationally configured within the housing, and a laser peening device located within the housing and configured to perform active laser peening on a predetermined surface of the gear while the gear is rotated within the housing.

In addition to one or more of the features described above, or as an alternative, further embodiments may include that the laser peening device includes a laser head configured to provide a laser pulse therefrom and a sensor configured to determine that the predetermined surface of the gear is in front of the laser head.

In addition to one or more of the features described above, or as an alternative, further embodiments may include that the sensor is an optical sensor configured to detect a distance between the laser head and the predetermined surface of the gear.

In addition to one or more of the features described above, or as an alternative, further embodiments may include a power source electrically connected to the laser peening device.

In addition to one or more of the features described above, or as an alternative, further embodiments may include that the power source is located within the housing.

In addition to one or more of the features described above, or as an alternative, further embodiments may include that the predetermined surface is at least one of a bottom land and a tooth flank of the gear.

In addition to one or more of the features described above, or as an alternative, further embodiments may include that the gearbox contains water.

In addition to one or more of the features described above, or as an alternative, further embodiments may include that the gear is a first gear and the laser peening device is a first laser peening device. The gearbox further includes a second gear located within the housing and configured to operationally engage with the first gear and a second laser peening device configured to perform active laser peening on a predetermined surface of the second gear while the second gear is rotated within the housing.

In addition to one or more of the features described above, or as an alternative, further embodiments may include that the first laser peening device and the second laser peening device are subparts of a single laser peening device.

According to another embodiment, a method of maintaining compressive residual stresses in a gear is provided. The method includes operating a gearbox to rotate a gear within the gearbox and laser peening a predetermined surface of the gear with a laser peening device located within the gearbox.

In addition to one or more of the features described above, or as an alternative, further embodiments may include determining when the predetermined surface in front of a laser head of the laser peening device.

In addition to one or more of the features described above, or as an alternative, further embodiments may include that the predetermined surface is at least one of a bottom land and a tooth flank of the gear.

In addition to one or more of the features described above, or as an alternative, further embodiments may include filling the gearbox with water prior to performing the laser peening.

In addition to one or more of the features described above, or as an alternative, further embodiments may include that laser peening the predetermined surface includes determining the predetermined surface is in front of a laser head of the laser peening device, activating the laser head to apply a laser pulse to the predetermined surface, determining the predetermined surface is not located in front of the laser head, and deactivating the laser head.

In addition to one or more of the features described above, or as an alternative, further embodiments may include performing the laser peening at a predetermined frequency related to the operation of the gearbox.

According to another embodiment, a method of manufacturing a gearbox includes installing a gear having a plurality of teeth within a housing and installing a laser peening device within the housing proximal to the gear and configured to perform active laser peening on a predetermined surface of the gear while the gear is rotated within the housing.

In addition to one or more of the features described above, or as an alternative, further embodiments may include configuring a sensor within the gearbox to determine that the predetermined surface of the gear is in front of the laser head.

In addition to one or more of the features described above, or as an alternative, further embodiments may include electrically connecting a power source to the laser peening device.

In addition to one or more of the features described above, or as an alternative, further embodiments may include that the gear is a first gear and the laser peening device is a first laser peening device. The method further includes installing a second gear within the housing, configuring the second gear to operationally engage with the first gear, installing a second laser peening device within the housing, configuring the second laser peening device to perform active laser peening on a predetermined surface of the second gear while the second gear is rotated within the housing.

In addition to one or more of the features described above, or as an alternative, further embodiments may include that the first laser peening device and the second laser peening device are subparts of a single laser peening device.

Technical effects of embodiments of the present disclosure include active peening of a gear during operation within a gearbox. Further technical effects include re-establishing and/or maintaining compressive residual stresses within the gearbox during the operational life of the gear and/or during operation. Further technical effects include incorporating a laser peening device into a gearbox to perform active peening of a gear and gear teeth during operation of the gear within the gearbox.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 2A is a schematic illustration of a first step of an active peening processing in accordance with an embodiment of the present disclosure;

FIG. 2B is a second step of the active peening process shown in FIG. 2A;

FIG. 2C is a third step of the active peening process shown in FIG. 2A; and

FIG. 3 is a process of active peening within a gearbox in accordance with an embodiment of the present disclosure.

DETAILED DESCRIPTION

Figure 1:
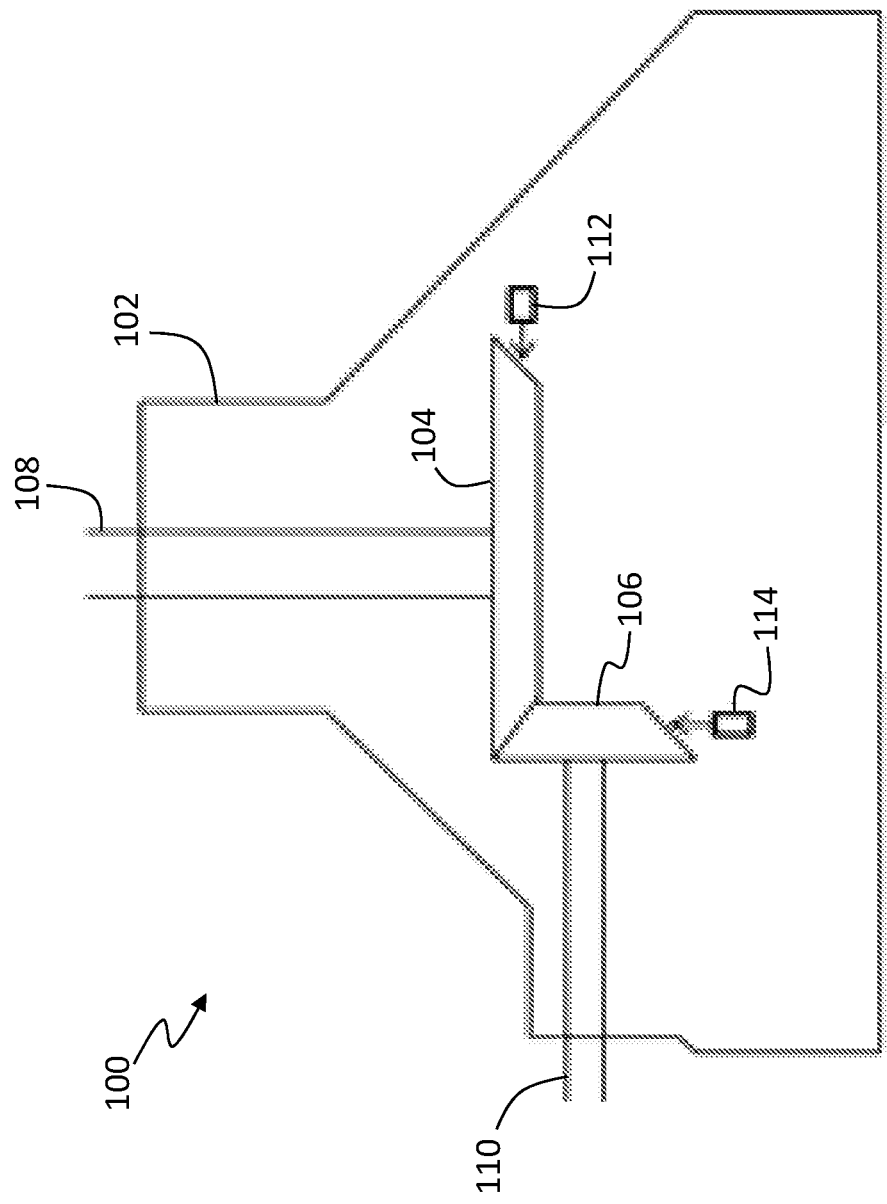
FIG. 1 is a schematic illustration of a gearbox configuration in accordance with an embodiment of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

General peening technology includes conventional shot peening, cavitation peening, and/or laser peening. These peening technologies and processes may be performed during the manufacture of a gear and formation of the gear teeth. Such processes may increase the compressive residual stress on gear tooth flanks and roots beyond the residual stresses induced during the heat treatment and final grinding processes of manufacture. However, as noted above, during the operational life of the gear, the residual stresses may relax and may result in the gear life not being optimal. Accordingly, in accordance with various embodiments disclosed herein, an active peening process is provided to extend the life of a gear and the gear teeth during the functional operation of the gear. That is, as disclosed herein, peening is performed within a gearbox on the gear and gear teeth during rotation of the gear within the gearbox.

Inside a gearbox, shot peening and cavitation peening may not be feasible. This is in part due to the space limitations within a gearbox. For example, with respect to cavitation peening, a gearbox does not provide sufficient room for the process, let alone allow for sufficient room for the necessary components. In the case of shot peening, if this process was used within a gearbox, the shot may be dispersed within the gearbox and thus interfere with operation of the gears. Moreover, in both cases, additional weight may be required in the structure of the gearbox. For example, for cavitation peening a body of water plus the equipment for cavitation peening would be required to be fitted into a gearbox. In the case of shot peening, the shot would need to be stored and carried within or proximal to the gearbox.

However, with laser peening, there is an opportunity to peen the gear teeth during operation or at a depot/service level without impacting or substantially impacting the operation of the gear or the structure of the gearbox. That is, one or more lasers may be configured within a gearbox and directed to perform laser peening on the gear teeth during operation (rotation) of the gear within the gearbox. For example, a laser peening head may be directed at or pointed at a gear tooth and be configured to direct a laser pulse at the tooth. During rotation of the gear, the laser peening head may perform laser peening on the gear tooth flanks and roots as the gear is rotating inside the gearbox.

Turning to FIG. 1, a gearbox configuration 100 in accordance with a non-limiting embodiment of the disclosure is shown. Gearbox 100 includes a gearbox housing 102 containing a first gear 104 and a second gear 106. The first gear 104 and the second gear 106 may each include a plurality of gear teeth that are configured to mesh with the gear teeth of the other gear 104, 106 so that the rotation or translation of the first gear 104 can be transmitted to the second gear 106, or vice versa. The first gear 104 may be driven by or drive a first gear shaft 108 and the second gear may be driven by or drive a second gear shaft 110. The driving or driven by aspect of the particular gear will depend on the operational configuration of the first gear 104 and the second gear 106 within the gearbox.

Also configured within the housing 102 may be a first laser peening device 112. The first laser peening device 112 may be configured to direct a laser pulse at a portion of the first gear 104. Similarly, a second laser peening device 114 may be configured to direct a laser pulse at a portion of the second gear 106. The first laser peening device 112 and the second laser peening device 114 may be configured to apply a laser pulse of sufficient power to the teeth of the respective gears to maintain, increase, and/or restore the compressive residual stresses of the gear teeth at desired levels, e.g. at the levels generated during the manufacturing process.

In one non-limiting example, a pulsed neodymium-doped glass laser may provide a roughly 25 J laser pulse over a 25 ns period toward the gear. Those of skill in the art will appreciate that any power and pulse frequency may be used without departing from the scope of the disclosure. For example, in some non-limiting embodiments, the power may be more or less than 25 J, and may be selected based on the material to be peened, i.e., the material of the gear and/or gear teeth. Those of skill in the art will appreciate that lasers of such power may be used during the initial peening process, i.e., during manufacture. Embodiments disclosed herein may employ lasers with power levels that are less than this as the processes described herein may be used to maintain or restore compressive residual stresses, rather than forming them initially. Thus, in some non-limiting embodiments, lasers having power levels one-one hundredth or even one-one thousandth of the above described levels may be employed.

Application of the laser pulse from the laser peening device may result in a plastic deformation of the surface of the impacted gear resulting in a compressive residual stress. The imparted compressive residual stress may increase the life of the gear, even during use and operation. That is, although compressive residual stresses imparted during manufacturing may relax over time, embodiments disclosed herein may counter the relaxation by restoring or reestablishing the compressive residual stresses during operation.

The laser peening devices 112, 114 may include a laser head, a power source, and one or more sensors in addition to other components. The power source may be a battery or other electrical power source. In some embodiments, the power source may be integrated into the laser peening device. In other embodiments, the power source may be remote and/or separate from the laser head of the laser peening device and an electrical cable or cord may be provided to supply power to the laser head. For example, a power source may be provided exterior to or outside of the housing 102 and a cable may be configured to pass through a wall of the housing 102 and electrically connect to the respective laser head.

A sensor may be used to determine when laser peening should be performed on the gear such that the laser may be activated only when necessary or desired. For example, an electrical or mechanical sensor may be configured to determine when a gear tooth flank and/or bottom land of the gear teeth is located before or in front of the laser. The position of the desired surface may trigger the application of laser peening from the laser head. In one non-limiting example, the laser head may be configured to perform both the sensing and laser peening operations. For example, a low power laser may be configured to measure a distance from the laser head to a surface of the gear that is in front of the laser head or about to be in front of the laser head. Based on the distance measurement it may be determined that a gear tooth bottom land is in front of the laser and thus the power may be increased to supply laser peening to the surface of the gear. In another embodiment, a separate sensor may be provided. In some embodiments a single sensor may be provided and operationally connected to both the first laser peening device 112 and the second laser peening device 114 such that the sensor can be used to trigger both laser heads of the laser peening devices 112, 114 when appropriate.

Turning now to FIGS. 2A-2C, a laser peening process in accordance with a non-limiting example is shown. In FIGS. 2A-2C a gear 204 and a laser peening device 212 may be configured within a gearbox (not shown), e.g., positioned as in the configuration shown in FIG. 1. For purposes of this description, the gear 204 includes a first bottom land 220, a second bottom land 222, and a top land 224 located therebetween. This pattern may be repeated around the circumference of the gear 204 to form the gear teeth. Arrow 226 indicates the direction of rotation of the gear 204 within the gearbox.

As shown in FIG. 2A the laser peening device 212 is applying a laser pulse to the first bottom land 220 and the adjacent tooth flanks, as indicated by the arrows extending from the laser peening device 212 toward a surface of the gear 204. Those of skill in the art will appreciate that the laser pulse may be configured to apply to as small or as large of a surface area of the gear 204 as desired. For example, in some embodiments, the laser pulse may be applied to only the bottom land and not configured to impact the tooth flanks.

As the gear 204 rotates, the top land 224 may move in front of the laser peening device 212, and specifically in front of the laser head of the laser peening device 212. It may not be desirable to laser peen the surface of the top land 224, and thus, as shown in FIG. 2B, the laser peening device 212 does not apply a laser pulse to a surface of the gear 204.

Finally, as shown in FIG. 2C, as the gear 204 rotates, the second bottom land will face the laser peening device 212 and thus the laser pulse may be applied to the surface of the gear 204.

The position of the top land 224 may be determined by any sensor or other device. For example, in one non-limiting embodiment, the laser peening device 212 may include an optical sensor (e.g., using the laser head or another optical device) to measure the distance between the laser peening device 212 and the surface of the gear 204. When the distance is decreasing it is determined that a top land is moving in front of the laser head and when the distance is increasing it is determined that a bottom land is moving in front of the laser head.

In some non-limiting embodiments, the laser peening device may not include a sensor. Rather, the laser peening device 212 may be configured to pulse the laser based on a predetermined frequency. That is, the laser peening device 212 may be configured based on the rotational speed of the gear 204 such that the laser applies or pulses the peening laser based on a frequency. As will be appreciated by those of skill in the art, various techniques may be used to determine when the laser peening device 212 should pulse or apply the peening laser to the gear 204.

Turning now to FIG. 3, a process of active laser peening in accordance with a non-limiting embodiment is shown. Process 300 may be performed during operation of a gear within a gearbox, whether operating in a service mode or an operational mode. That is, in some situations, process 300 may be performed with a gearbox attached to a vehicle or other device, such as a rotorcraft. When the rotorcraft is flying and/or when the rotors are spinning, the process 300 may be performed. In other situations process 300 may be performed when the vehicle is grounded and/or when the gearbox is removed from the vehicle. However, regardless of the particular situation and location of the gearbox, the process 300 may be performed without opening and/or disassembling the gearbox.

A gear is rotated in operational or service mode (step 302).

A laser peening device may be configured to determine if a predetermined surface of the gear is located in front of a laser head of the laser peening device (step 304). For example, it may be determined if a bottom land of a gear, i.e., the space between gear teeth, is located in front of the laser head. Those of skill in the art will appreciate that any surface may be desired to have laser peening applied thereto, and thus the process is not limited to application to a bottom land. For example, the predetermined surface may be bottom lands, tooth flanks, top lands, and/or combinations thereof and/or other surfaces of the gear. The determination of the presence of the predetermined surface in front of the laser head may be based on any of various methods and/or combinations thereof, e.g., as described above. This determination may alternatively be a determination that the predetermined surface is about to be located in front of the laser head.

If it is determined that a predetermined surface is located in front of the laser head (step 304), the laser peening device may activate the laser head (step 306). The activation of the laser head may be at sufficient power to laser peen the predetermined surface and thus increase the compressive residual stress at the predetermined surface. Further, the application of the laser may be for sufficient duration to laser peen the predetermined surface.

It may then be determined that the predetermined surface is no longer in front of the laser head (step 308) or that the predetermined surface is about to end. When it is determined that the predetermined surface is no longer in front of the laser head, the laser head is de-activated (step 310). Thus, the laser application is only applied where it is predetermined or desired to be applied to.

The process 300 will repeat for each predetermined surface as the gear rotates in front of the laser peening device. In some embodiments, the application may be applied to every predetermined surface on every rotation of the gear, e.g., a portion of every tooth in sequential order as the gear rotates. In other embodiments, the application of the laser may be based on some predetermined criteria. For example, in one non-limiting embodiment, the laser peening may be applied to the predetermined surfaces once every second, third, tenth, hundredth, etc. rotation of the gear. As such, the process may be configured to apply laser peening to the predetermined surfaces such that the compressive residual stress of the gear is maintained at or restored to sufficient levels, thus increasing the life of the gear.

The laser peening process may require the use of water to control the reaction between the laser and the gear surfaces and also may reduce the amount of energy that may escape, allowing a fusion impulse into the material of the gear and producing a compressive residual stress field on the surface and subsurface. Thus, in accordance with some non-limiting embodiments, water may replace gearbox oil to control the impulse during application of the laser peening. That is, in some embodiments, such as when the process is performed in a depot or service operation, the gearbox may be drained of operating fluids (e.g., oil) and water may be supplied into the gearbox. With the water in the gearbox, the process of active laser peening within the gearbox may be performed, e.g., process 300. After completion, the water may be drained from the gearbox and an operating fluid (e.g., oil) may be supplied into the gearbox prior to returning the gearbox to service.

In other embodiments, the process of active laser peening may be performed during use of the gear in an operational setting. That is, for example, when the gear is used in a rotorcraft, the process of active laser peening may be performed when the rotors of the craft are rotated. In such embodiments, power for the laser peening device may be supplied from the rotorcraft. It will be appreciated that in such embodiments, the laser peening may be performed using the operating fluid (e.g., oil) as the fluid between the laser head and the surface to be laser peened.

Advantageously, embodiments described herein provide a system for re-establishing and/or maintaining compressive residual stresses that have or may relax during loading (cold working) within a gear. Thus, advantageously, gear load carrying capability and gear life can be improved beyond the initial peening performed when the gears are initially fabricated.

Further, advantageously, embodiments described herein enable active laser peening of gear surfaces from within a gearbox. Thus, advantageously, embodiments eliminate the need or process of disassembling the gear box to remove the gear from the gearbox and perform peening.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A gearbox comprising:
    a housing;
    a gear having a plurality of teeth operationally configured within the housing; and a laser peening device located within the housing and configured to perform active laser peening on a predetermined surface of the gear while the gear is rotated within the housing.

2. The gearbox of claim 1, wherein the laser peening device comprises:
    a laser head configured to provide a laser pulse therefrom; and
    a sensor configured to determine that the predetermined surface of the gear is in front of the laser head.

3. The gearbox of claim 2, wherein the sensor is an optical sensor configured to detect a distance between the laser head and the predetermined surface of the gear.

4. The gearbox claim 1, further comprising a power source electrically connected to the laser peening device.

5. The gearbox of claim 4, wherein the power source is located within the housing.

6. The gearbox of claim 1, wherein the predetermined surface is at least one of a bottom land and a tooth flank of the gear.

7. The gearbox of claim 1, wherein the gearbox contains water.

8. The gearbox of claim 1, wherein the gear is a first gear and the laser peening device is a first laser peening device, the gearbox further comprising: a second gear located within the housing and configured to operationally engage with the first gear; and a second laser peening device configured to perform active laser peening on a predetermined surface of the second gear while the second gear is rotated within the housing.

9. The gearbox of claim 8, wherein the first laser peening device and the second laser peening device are subparts of a single laser peening device.

10. A method of maintaining compressive residual stresses in a gear, the method comprising:
    operating a gearbox to rotate a gear within the gearbox; and
    laser peening a predetermined surface of the gear with a laser peening device located within the gearbox.

11. The method of claim 10, further comprising determining when the predetermined surface is in front of a laser head of the laser peening device.

12. The method of claim 10, wherein the predetermined surface is at least one of a bottom land and a tooth flank of the gear.

13. The method of claim 10, further comprising filling the gearbox with water prior to performing the laser peening.

14. The method of claim 10, wherein laser peening the predetermined surface comprises:
    determining the predetermined surface is in front of a laser head of the laser peening device;
    activating the laser head to apply a laser pulse to the predetermined surface;
    determining the predetermined surface is not located in front of the laser head; and
    deactivating the laser head.

15. The method of claim 10, further comprising performing the laser peening at a predetermined frequency related to the operation of the gearbox.

16. A method of manufacturing a gearbox comprising:
    installing a gear having a plurality of teeth within a housing; and
    installing a laser peening device within the housing proximal to the gear and configured to perform active laser peening on a predetermined surface of the gear while the gear is rotated within the housing.

17. The method of claim 16, further comprising configuring a sensor within the gearbox to determine that the predetermined surface of the gear is in front of the laser head.

18. The method of claim 16, further comprising electrically connecting a power source to the laser peening device.

19. The method of claim 16, wherein the gear is a first gear and the laser peening device is a first laser peening device, the method further comprising:
    installing a second gear within the housing;
    configuring the second gear to operationally engage with the first gear;
    installing a second laser peening device within the housing; and
    configuring the second laser peening device to perform active laser peening on a predetermined surface of the second gear while the second gear is rotated within the housing.

20. The method of claim 19, wherein the first laser peening device and the second laser peening device are subparts of a single laser peening device.

* * * * *